F. W. OLDHAM & E. L. MILES.
TRACTOR.
APPLICATION FILED NOV. 21, 1912.
1,101,323.
Patented June 23, 1914.
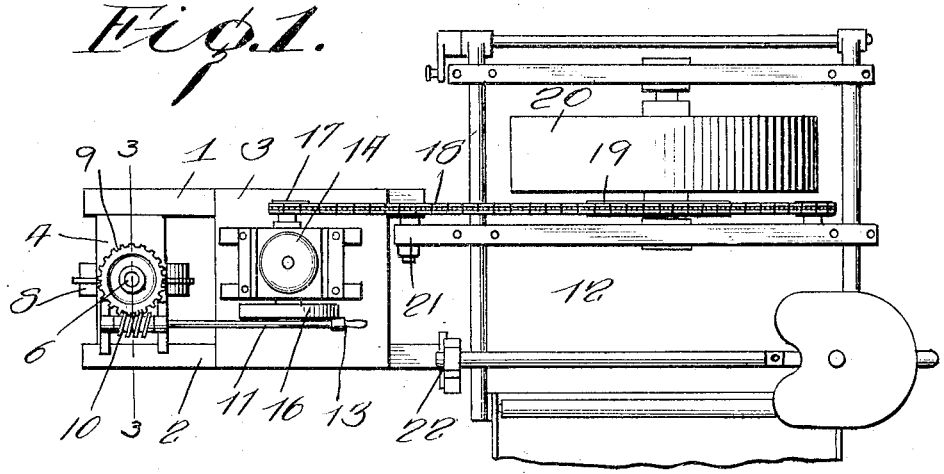
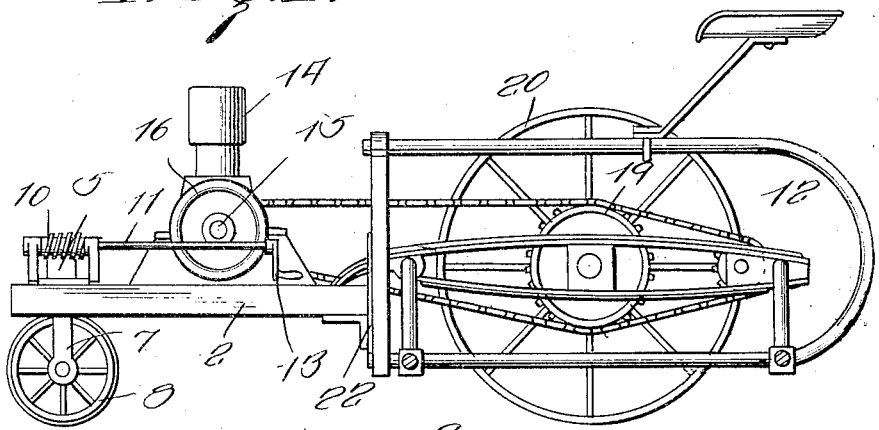
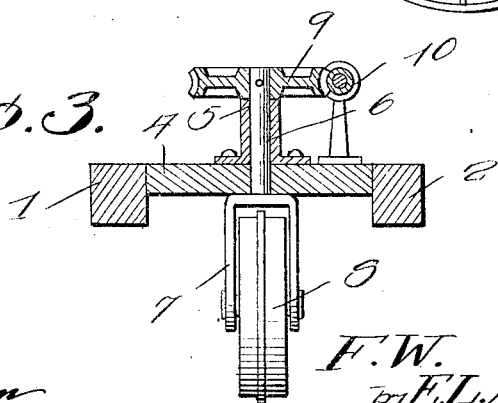
Witnesses
Inventors
F. W. Oldham
E. L. Miles
Attorney

UNITED STATES PATENT OFFICE.

FRANK W. OLDHAM AND EZRA L. MILES, OF STANLEY, KENTUCKY.

TRACTOR.

1,101,323.

Specification of Letters Patent. Patented June 23, 1914.

Application filed November 21, 1912. Serial No. 732,740.

*To all whom it may concern:*

Be it known that we, FRANK W. OLDHAM and EZRA L. MILES, citizens of the United States, residing at Stanley, in the county of Daviess, State of Kentucky, have invented certain new and useful Improvements in Tractors; and we do hereby declare the following to be a full, clear, and exact description of the invention, such as will enable others skilled in the art to which it appertains to make and use the same.

The present invention is directed to tractors designed for attachment to self binding harvesters.

The invention has for its object to construct a tractor in such a manner that the same may be connected to a harvester machine of any well known construction.

A further object of the invention is to provide a tractor so constructed that the same may be attached to the usual connection for connecting the tongue to the machine.

A still further object of the invention is to provide a device of this character which will when attached serve to propel the machine across the field and at the same time operate the necessary parts of the binder and harvester.

With these and other objects in view, this invention resides in the novel features of construction, formation, combinations and arrangements of parts to be hereinafter more fully described, claimed and illustrated in the accompanying drawing, in which:—

Figure 1 is a fragmentary top elevation of a harvester showing the tractor connected thereto. Fig. 2 is a side elevation. Fig. 3 is a sectional view on line 3—3 of Fig. 1.

Referring to the drawing, the numerals 1 and 2 designate longitudinal beams upon which is supported a platform 3. The forward ends of the beams are held in spaced relation by a bar 4, said bar being provided with a bearing 5 in which is mounted a shaft 6, the lower end of said shaft being forked, as at 7 to support a wheel 8.

Fixed to the upper end of the shaft 6 is a worm wheel 9 having in mesh therewith a worm shaft 10, said shaft terminating in a stem 11, said stem being of sufficient length to be in convenient reach of the operator of the harvester 12. The extreme inner end of the stem 11 is provided with a crank 13 and by which the same may be rotated to impart rotary movement through the worm wheel 9 to the shaft 6 which operates the wheel 8 to guide the harvester 12.

Mounted on the platform is a gas engine 14, one end of the crank shaft 15 thereof being provided with a fly wheel 16, while the other carries a sprocket wheel 17, over and around which passes a sprocket chain 18, said sprocket chain serving to connect the sprocket 17 and the sprocket 19, the latter being suitably secured to the usual main wheel 20 of the harvester.

In applying the tractor to the harvester the usual tongue is removed and the beam 1 bolted to the connection 21, usually employed for connecting the tongue. The beam 2 is bolted to the casting 22 which had previously been employed for connecting the usual tongue brace.

From the foregoing description it will be seen that a tractor has been provided which may be conveniently applied to a well known harvester simply upon removing the tongue, the engine 14 serving to not only propel the harvester, but at the same time operates the parts of the harvester. Further it will be seen that the harvester may be guided upon manipulation of the stem 11, which through the medium of the shaft 10 and wheel 9 imparts proper movement to the wheel 8.

What is claimed is:—

A tractor attachment for agricultural implements having a tongue connection and a tongue brace connecting casting, comprising a pair of longitudinally spaced beams, one of which has its inner end bolted to the tongue connection and the other its inner end bolted to the tongue connecting casting, a bar connecting the forward ends of the beams, a shaft journaled in the bar, a wheel carried by the lower end of the shaft, a worm wheel fixed to the upper end of the shaft, a worm shaft in mesh with said wheel, a stem carried by the worm shaft for imparting rotary movement thereto, an engine mounted upon the tractor, a sprocket chain connecting the engine shaft and main wheel of the implement, as and for the purpose set forth.

In testimony whereof, we affix our signatures, in the presence of two witnesses.

FRANK W. OLDHAM.
EZRA L. MILES.

Witnesses:
JAMES HILL,
W. A. COX.